United States Patent
Jeong et al.

(10) Patent No.: US 11,784,377 B2
(45) Date of Patent: Oct. 10, 2023

(54) SEPARATOR INCLUDING POROUS COATING LAYER WITH AMORPHOUS ADHESIVE BINDER POLYMER AND FLUORINATED BINDER POLYMER AND ELECTROCHEMICAL DEVICE INCLUDING THE SAME

(71) Applicant: LG CHEM, LTD., Seoul (KR)

(72) Inventors: So-Mi Jeong, Daejeon (KR); Young-Bok Kim, Daejeon (KR); Je-An Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 311 days.

(21) Appl. No.: 16/960,218

(22) PCT Filed: Sep. 20, 2019

(86) PCT No.: PCT/KR2019/012271
§ 371 (c)(1),
(2) Date: Jul. 6, 2020

(87) PCT Pub. No.: WO2020/060310
PCT Pub. Date: Mar. 26, 2020

(65) Prior Publication Data
US 2021/0066692 A1    Mar. 4, 2021

(30) Foreign Application Priority Data

Sep. 21, 2018 (KR) .................. 10-2018-0114300

(51) Int. Cl.
*H01M 50/449* (2021.01)
*H01M 50/446* (2021.01)
(Continued)

(52) U.S. Cl.
CPC ..... *H01M 50/449* (2021.01); *H01M 10/0525* (2013.01); *H01M 50/411* (2021.01); *H01M 50/443* (2021.01); *H01M 50/446* (2021.01)

(58) Field of Classification Search
CPC . H01M 50/449; H01M 50/446; H01M 50/411
(Continued)

(56) References Cited

U.S. PATENT DOCUMENTS

| 2011/0045338 A1* | 2/2011 | Bae ............... H01M 50/417 429/144 |
| 2016/0118636 A1 | 4/2016 | Jin et al. |

(Continued)

FOREIGN PATENT DOCUMENTS

| CN | 105324870 A | 2/2016 | |
| CN | 105406009 A * | 3/2016 | ......... H01M 10/058 |

(Continued)

OTHER PUBLICATIONS

Ulaganathan et al., "Preparation and characterizations of PVAc/P(VdF-HFP)-based polymer blend electrolytes", Ionics (2010) 16:515-521.
(Continued)

*Primary Examiner* — Sean P Cullen
(74) *Attorney, Agent, or Firm* — Morgan, Lewis & Bockius LLP

(57) ABSTRACT

The present disclosure relates to a separator and an electrochemical device including the same. The separator includes a porous coating layer formed on at least one surface of the porous polymer substrate, wherein the porous coating layer includes, as a binder polymer, an amorphous adhesive binder polymer, and at least one fluorinated binder polymer. It is possible to provide a separator which shows low resistance and significantly improved adhesion to an electrode, and an electrochemical device including the same.

16 Claims, 4 Drawing Sheets

(51) Int. Cl.
  *H01M 50/411* (2021.01)
  *H01M 10/0525* (2010.01)
  *H01M 50/443* (2021.01)

(58) Field of Classification Search
  USPC ........................................ 429/144, 251, 254
  See application file for complete search history.

(56) References Cited

U.S. PATENT DOCUMENTS

2016/0293999 A1* 10/2016 Kim ..................... H01M 50/411
2019/0103593 A1   4/2019 Kai et al.

FOREIGN PATENT DOCUMENTS

| JP | 2016-072162 | A |   | 5/2016 | |
|----|-------------|---|---|--------|---|
| JP | 2016072162  | A | * | 5/2016 | |
| JP | 6334071     | B1| * | 5/2018 | ............. B32B 27/08 |
| KR | 10-2007-0012057 | A | | 1/2007 | |
| KR | 10-0727248  | B1|   | 6/2007 | |
| KR | 10-2013-0093977 | A | | 8/2013 | |
| KR | 10-2013-0126445 | A | | 11/2013 | |
| KR | 10-2014-0073957 | A | | 6/2014 | |
| KR | 10-2015-0106811 | A | | 9/2015 | |
| KR | 10-2016-0061165 | A | | 5/2016 | |
| KR | 10-2016-0127473 | A | | 11/2016 | |
| KR | 10-2016-0132651 | A | | 11/2016 | |
| KR | 10-1742652  | B1|   | 6/2017 | |
| KR | 10-1751443  | B1|   | 6/2017 | |
| KR | 10-2018-0093831 | A | | 8/2018 | |
| WO | 2015/076574 | A1|   | 5/2015 | |
| WO | 2017/169845 | A1|   | 10/2017 | |
| WO | WO-2018055882 | A1 | * | 3/2018 | ............. B32B 27/08 |

OTHER PUBLICATIONS

International Search Report (with partial translation) and Written Opinion issued in corresponding International Patent Application No. PCT/KR2019/012271, dated Dec. 27, 2019.
Extended European Search Report issued by the European Patent Office dated Mar. 19, 2021 in a corresponding European Patent Application No. 19862459.5.

* cited by examiner

SEPARATOR INCLUDING POROUS COATING LAYER WITH AMORPHOUS ADHESIVE BINDER POLYMER AND FLUORINATED BINDER POLYMER AND ELECTROCHEMICAL DEVICE INCLUDING THE SAME

TECHNICAL FIELD

The present disclosure relates to a separator applicable to an electrochemical device, such as a lithium secondary battery, and an electrochemical device including the same.

The present application claims priority to Korean Patent Application No. 10-2018-0114300 filed on Sep. 21, 2018 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety-related problem of an electrochemical device, there has been suggested a separator including a porous coating layer formed by coating a mixture of inorganic particles with a binder polymer on at least one surface of a porous polymer substrate having a plurality of pores.

Meanwhile, there is still a need for higher adhesion (Lami strength) between a separator and an electrode in order to improve the production rate in terms of processing and to reduce defects of finished electrochemical devices. To increase such adhesion, an adhesive layer may be introduced onto the porous coating layer. In this case, interfacial resistance between the porous coating layer and the adhesive layer is increased to cause degradation of the output of an electrochemical device. In addition, when the loading amount of slurry for forming an adhesive layer or the content of a binder polymer is increased to further improve such adhesion, resistance is increased undesirably.

To solve the above-mentioned problems, the present disclosure is directed to providing a separator which reduces the resistance of an electrochemical device, while showing improved adhesion to an electrode.

DISCLOSURE

Technical Problem

The present disclosure is designed to solve the problems of the related art, and therefore the present disclosure is directed to providing a separator for an electrochemical device which shows improved adhesion to an electrode and provides reduced resistance.

The present disclosure is also directed to providing an electrochemical device including the separator.

Technical Solution

In one aspect of the present disclosure, there is provided a separator according to any one of the following embodiments.

According to the first embodiment of the present disclosure, there is provided a separator for an electrochemical device, including:

a porous polymer substrate having a plurality of pores; and a porous coating layer formed on at least one surface of the porous polymer substrate, and containing a plurality of inorganic particles and a binder polymer positioned on the whole or a part of the surface of the inorganic particles to connect the inorganic particles with one another and fix them, wherein the binder polymer includes an amorphous adhesive binder polymer; and at least one fluorinated binder polymer, and the content of the amorphous adhesive binder polymer is 50-84 parts by weight based on 100 parts by weight of the total binder polymer content.

According to the second embodiment of the present disclosure, there is provided the separator for an electrochemical device as defined in the first embodiment, wherein the amorphous adhesive binder polymer has a crystallinity of 0% and weight average molecular weight of 1,000,000 or less, and is compatible with the fluorinated binder polymer.

According to the third embodiment of the present disclosure, there is provided the separator for an electrochemical device as defined in the first or the second embodiment, wherein the amorphous adhesive binder polymer includes repeating units derived from at least one monomer selected from a vinyl-based monomer and an acrylic monomer, and has a glass transition temperature less than 70° C.

According to the fourth embodiment of the present disclosure, there is provided the separator for an electrochemical device as defined in the third embodiment, wherein the amorphous adhesive binder polymer further includes repeating units derived from an imide-, ester- or ether-based monomer, in addition to the vinyl-based monomer.

According to the fifth embodiment of the present disclosure, there is provided the separator for an electrochemical device as defined in the third embodiment, wherein the amorphous adhesive binder polymer is a polymer including repeating units derived from C1-C12 (meth)acrylate, C1-C12 cycloalkyl (meth)acrylate, C1-C12 sulfoalkyl (meth)acrylate, (2-acetoacetoxy)ethyl (meth)acrylate, or a mixture of at least two of them; polyvinyl acetate; polystyrene; polyoxyethylene (meth)acrylate; poly(ethylene glycol) methyl ether (meth)acrylate; or a mixture of at least two of them.

According to the sixth embodiment of the present disclosure, there is provided the separator for an electrochemical device as defined in the fifth embodiment, wherein the amorphous adhesive binder polymer includes polyvinyl acetate.

According to the seventh embodiment of the present disclosure, there is provided the separator for an electrochemical device as defined in any one of the first to the sixth embodiments, wherein the fluorinated binder polymer includes polyvinylidene fluoride-co-hexafluoropropylene (PVdF-HFP), polyvinylidene fluoride-co-chlorotrifluoroethylene, polyvinylidene fluoride-co-polytetrafluoroethylene (PVdF-PTFE), a mixture of at least two of them.

According to the eighth embodiment of the present disclosure, there is provided the separator for an electrochemical device as defined in the seventh embodiment, wherein the fluorinated binder polymer includes polyvinylidene fluoride-co-hexafluoropropylene (PVdF-HFP) and polyvinylidene fluoride-co-chlorotrifluoroethylene.

According to the ninth embodiment of the present disclosure, there is provided the separator for an electrochemical device as defined in the eighth embodiment, wherein the weight ratio of polyvinylidene fluoride-co-hexafluoropropylene (PVdF-HFP) to polyvinylidene fluoride-co-chlorotrifluoroethylene is 90:10-50:50.

According to the tenth embodiment of the present disclosure, there is provided the separator for an electrochemical device as defined in any one of the first to the ninth embodiments, wherein the content of the amorphous adhesive binder polymer is 55-80 parts by weight based on 100 parts by weight of the total binder polymer content.

According to the eleventh embodiment of the present disclosure, there is provided the separator for an electrochemical device as defined in any one of the first to the tenth embodiments, wherein the weight ratio of the inorganic particles to the binder polymer is 90:10-50:50.

According to the twelfth embodiment of the present disclosure, there is provided the separator for an electrochemical device as defined in any one of the first to the eleventh embodiments, wherein the amorphous adhesive binder polymer and the fluorinated binder polymer are distributed homogeneously in the thickness direction of the porous coating layer.

According to the thirteenth embodiment of the present disclosure, there is provided the separator for an electrochemical device as defined in any one of the first to the twelfth embodiments, wherein the internal resistance of the porous coating layer equals to the surface resistance of the porous coating layer.

According to the fourteenth embodiment of the present disclosure, there is provided the separator for an electrochemical device as defined in any one of the first to the thirteenth embodiments, wherein the porous coating layer is formed at a temperature of 20-45° C. under a relative humidity of 15-70%.

In another aspect of the present disclosure, there is also provided an electrochemical device according to the following embodiment.

According to the fifteenth embodiment of the present disclosure, there is provided an electrochemical device including a cathode, an anode, and a separator interposed between the cathode and the anode, wherein the separator is the same as defined in any one of the first to the fourteenth embodiments.

Advantageous Effects

The separator according to an embodiment of the present disclosure uses an amorphous adhesive binder polymer and a fluorinated binder polymer at the same time. As a result, it is possible to form a porous coating layer free of a certain thickness of binder layer on the surface thereof and including the binder polymers distributed homogeneously in the thickness direction of the porous coating layer.

It is also possible to provide an electrochemical device having lower resistance as compared to the electrochemical devices including the conventional separators, while showing significantly improved adhesion between the separator and an electrode.

BEST MODE

Figure 1A:
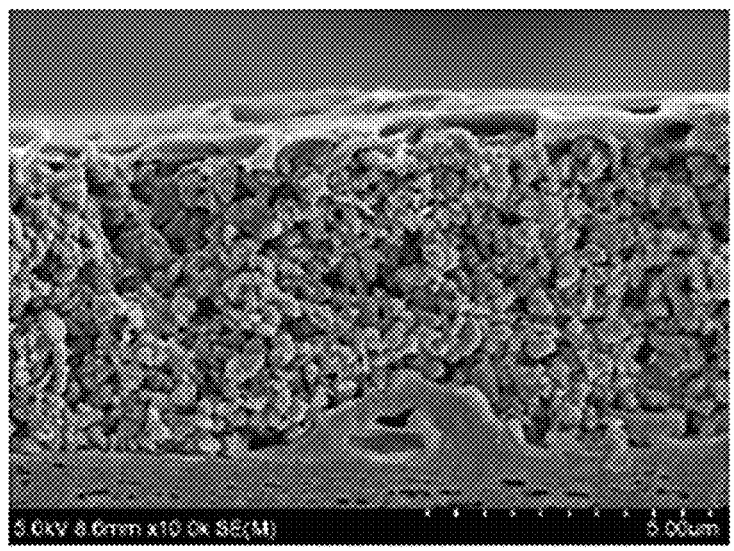
FIG. 1A to FIG. 1C show scanning electron microscopic (SEM) images illustrating the section and the surface of the separator according to Comparative Example 1.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

As used herein, the expression 'one portion is connected to another portion' covers not only 'a portion is directly connected to another portion' but also 'one portion is connected indirectly to another portion' by way of the other element interposed between them. In addition, 'connection' covers electrochemical connection as well as physical connection.

Throughout the specification, the expression 'a part includes an element' does not preclude the presence of any additional elements but means that the part may further include the other elements.

In addition, it will be understood that the terms "comprises" and/or "comprising", or "includes" and/or "including" when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

As used herein, the expression 'A and/or B' means 'A, B or both of them'.

In an electrochemical device, such as a lithium secondary battery, a separator generally uses a porous polymer substrate, and thus has the problem of heat shrinking behavior. Therefore, a porous coating layer is introduced to reduce the heat shrinkage of a separator.

Meanwhile, there is still a need for higher adhesion (Lami strength) between a separator and an electrode in order to improve the production rate in terms of processing and to reduce defects of finished electrochemical devices.

To increase the adhesion between a separator and an electrode, an adhesive layer is introduced in some cases. Such an adhesive layer may be formed by coating a porous coating layer through a so-called humidified phase separation process, and drying the porous coating layer under a humidified condition so that the binder polymer in the slurry for a porous coating layer may be distributed predominantly on the surface of the porous coating layer. However, in this case, there is a difference between the internal resistance of the porous coating layer and the interfacial resistance of the resultant adhesion layer, resulting in the problem of degradation of output characteristics of a battery.

In addition, the adhesive layer may be formed by applying slurry containing a binder resin separately to a porous coating layer, followed by drying. However, in this case, the interfacial resistance between the porous coating layer and the adhesive layer is increased, resulting in the problem of degradation of the output of an electrochemical device. Moreover, when the coating loading amount is increased to further improve the adhesion, the interfacial resistance is highly increased.

The inventors of the present disclosure have conducted many studies to overcome the above-mentioned problems. The present disclosure is directed to providing a separator which has improved adhesion to an electrode without forming a separate adhesive layer, wherein the internal resistance of the porous coating layer and the interfacial resistance thereof are equal or similar to each other, thereby reducing the resistance of an electrochemical device.

To solve the above-mentioned problems, in one aspect of the present disclosure, there is provided a separator for an electrochemical device, including:

a porous polymer substrate having a plurality of pores; and a porous coating layer formed on at least one surface of the porous polymer substrate, and containing a plurality of inorganic particles and a binder polymer positioned on the whole or a part of the surface of the inorganic particles to connect the inorganic particles with one another and fix them, wherein the binder polymer includes an amorphous adhesive binder polymer; and at least one fluorinated binder polymer, and the content of the amorphous adhesive binder polymer is 50-84 parts by weight based on 100 parts by weight of the total binder polymer content.

The separator for an electrochemical device according to an embodiment of the present disclosure includes an amorphous adhesive binder polymer and at least one fluorinated binder polymer.

In the case of a conventional separator including a porous coating layer containing a fluorinated binder polymer alone, an adhesive layer is formed on the surface of the porous coating layer through so-called humidified phase separation, or a binder layer (or adhesive layer) is coated separately to impart adhesion between the separator and an electrode. However, when humidified phase separation is carried out by using a fluorinated binder polymer alone, a high content of binder is required to ensure sufficient adhesion to an electrode, and the adhesive layer formed on the porous coating layer surface may increase the interfacial resistance.

On the contrary, when using an amorphous adhesive binder polymer and a fluorinated binder polymer at the same time according to an embodiment of the present disclosure, no adhesive layer is formed on the porous coating layer even through humidified phase separation, and it is possible to provide an electrochemical device having significantly improved adhesion to an electrode as compared to the conventional separators. In other words, the binder polymer in the porous coating layer does not form a separate adhesive layer but is distributed homogeneously in the porous coating layer. Therefore, the internal resistance of the porous coating layer and the surface resistance thereof are equal. It is thought that this is because the amorphous adhesive binder polymer has high adhesion to provide excellent adhesion to an electrode, and the amorphous adhesive binder polymer shows excellent compatibility with the fluorinated binder polymer.

The separator according to an embodiment of the present disclosure is free of separate adhesive layer, and thus has low resistance. Therefore, when using the separator, it is possible to provide an electrochemical device having improved output characteristics by virtue of high affinity with an electrolyte as compared to the fluorinated binder polymer and low resistance of the separator.

As used herein, "amorphous adhesive binder polymer" means a binder polymer which is electrochemically stable, shows adhesive property, and has a crystallinity of 0%.

Herein, the crystallinity may be determined by using a differential scanning calorimeter (DSC). Particularly, when a polymer sample includes a crystalline material, a melting peak is observed. The crystallinity may be calculated according to the following Formula 1:

$$\text{Crystalinity} = \frac{\Delta Hm}{\Delta Hm°} \times 100\% \qquad \text{[Formula 1]}$$

Herein, $\Delta Hm$ represents the integral (unit: J/g) of a melting peak using the integral function provided in a software (universal analysis, version 4.3A); and $\Delta Hm°$ represents the calorie (unit: J/g) upon melting of 1 g of a 100% crystalized polymer sample.

When such a melting peak (e.g. melting point, crystallization temperature, or the like) is not observed, it is defined that the crystallinity is 0%.

As used herein, "amorphous adhesive binder polymer" has compatibility with the fluorinated binder polymer.

Particularly, the compatibility of the amorphous adhesive binder polymer with the fluorinated binder polymer may be determined and defined by the following method:

In other words, when the amorphous adhesive binder polymer and the fluorinated binder polymer are blended and analyzed by a differential scanning calorimeter, a case wherein no peaks corresponding to each of the amorphous adhesive binder polymer and the fluorinated binder polymer appear, and the glass transition temperature shifts toward the right or left side based on the X-axis is defined as "the amorphous adhesive binder polymer has compatibility with the fluorinated binder polymer". When the amorphous adhesive binder polymer has compatibility with the fluorinated binder polymer as mentioned above, the amorphous binder polymer and the fluorinated binder polymer form a blend in which they are distributed homogeneously.

According to an embodiment of the present disclosure, the amorphous adhesive binder polymer may have a weight average molecular weight of 1,000,000 g/mol or less, 900,000 g/mol or less, or 800,000 g/mol or less. In addition, the amorphous adhesive binder polymer may have a weight average molecular weight of 200,000 g/mol or more, 250,000 g/mol or more, 300,000 g/mol or more, 350,000 g/mol or more, or 400,000 g/mol or more. When the adhesive binder polymer has a weight average molecular weight of 1,000,000 g/mol or less, the adhesive binder polymer is dissolved well in the solvent contained in the slurry for forming a porous coating layer, high processability is obtained when coating the slurry for forming a porous coating layer onto a porous substrate, and the compatibility of the adhesive binder polymer with the fluorinated binder polymer may be improved.

According to an embodiment of the present disclosure, the amorphous adhesive binder polymer includes repeating units derived from at least one monomer selected from a vinyl-based monomer and an acrylic monomer, and may have a glass transition temperature lower than 70° C.

According to an embodiment of the present disclosure, the amorphous adhesive binder polymer may further include repeating units derived from an imide-, ester- or ether-based monomer, in addition to the vinyl-based monomer.

According to an embodiment of the present disclosure, the amorphous adhesive binder polymer may include a polymer including repeating units derived from C1-C12 (meth)acrylate, C1-C12 cycloalkyl (meth)acrylate, C1-C12 sulfoalkyl (meth)acrylate, (2-acetoacetoxy)ethyl (meth) acrylate, or a mixture of at least two of them; polyvinyl acetate; polystyrene; polyoxyethylene (meth)acrylate; poly (ethylene glycol) methyl ether (meth)acrylate; or a mixture of at least two of them.

Meanwhile, the amorphous adhesive binder polymer may be controlled to a glass transition temperature lower than 70° C. by controlling the compositional ratio of the monomers or polymers contained in the mixture.

Particularly, the amorphous adhesive binder polymer may include polyvinyl acetate. Polyvinyl acetate is electrochemically stable and thus causes no side reaction with electrolyte, or the like. In addition, polyvinyl acetate has a glass transition temperature lower than 70° C., which is relatively lower than the lamination temperature, and thus can improve the adhesion to an electrode by virtue of its adhesive property during a lamination process. In addition, polyvinyl acetate is preferred in that it has high compatibility with the fluorinated binder polymer so that it may be distributed homogeneously in the porous coating layer.

Meanwhile, when the amorphous adhesive binder polymer is blended with the fluorinated binder polymer, no binder layer (or adhesive layer) is formed on the porous coating layer surface, even when humidified phase separation is carried out, unlike the porous coating layer using the fluorinated binder polymer alone as a binder polymer. In other words, the binder polymers, i.e. the amorphous adhesive binder polymer (e.g. polyvinyl acetate) and the fluorinated binder polymer are distributed homogeneously in the thickness direction of the porous coating layer unexpectedly. In other words, in the porous coating layer, the internal resistance of the porous coating layer and the surface resistance thereof may be equal.

As used herein, 'equal' refers to equality or similarity within an error range.

When using the fluorinated binder polymer alone as a binder polymer, during the humidifying (exposure to a non-solvent) process carried out after coating the porous substrate with slurry for forming a porous coating layer including a solvent, the fluorinated binder polymer, a dispersing agent and inorganic particles, pores are formed through the exchange of the solvent with the non-solvent. Herein, the fluorinated binder polymer is solidified so that it may be distributed predominantly on the surface of the porous coating layer.

On the contrary, when using the amorphous binder polymer having polar groups and showing adhesive property in combination with the fluorinated binder polymer, micro-scaled pores are not formed through phase separation, since the solubility to the solvent is still high by virtue of the polar functional groups, despite the exposure to a non-solvent. In addition, since the polar functional groups provide high affinity with the inorganic particles, migration toward the porous coating layer surface hardly occurs upon the solvent evaporation during a drying step.

When using the fluorinated binder polymer in combination with the amorphous binder polymer according to the present disclosure, the two materials have high compatibility to cause a change in phase transition characteristics, to form a porous structure in the porous coating layer and to prevent migration toward the porous coating layer surface. Such characteristics are preferred, since a higher content of amorphous binder polymer lowers phase separation so that a larger amount of pores may be formed inside of the porous coating layer.

In addition, the amorphous adhesive binder polymer has higher affinity with an electrolyte, as compared to the fluorinated binder polymer. Therefore, when using the adhesive binder polymer according to the present disclosure, it is possible to improve the output of a battery. See, the following Test Examples 1A and 1B.

Meanwhile, the content of the amorphous adhesive binder polymer is 50-84 parts by weight based on 100 parts by weight of the total binder polymer content.

According to an embodiment of the present disclosure, the content of the amorphous adhesive binder polymer may be 50-80 parts by weight, 55-80 parts by weight, or 55-70 parts by weight.

When using the amorphous binder polymer alone as a binder polymer, adhesion is increased. However, in this case, the separator shows excessively high air permeability and causes separation of the coating layer during the injection of an electrolyte, and thus is not suitable as a separator for an electrochemical device.

In addition, when the content of the adhesive binder polymer is larger than 84 parts by weight, air permeability is low and a certain degree of adhesion is realized. However, in this case, the coating layer is separated during the injection of an electrolyte, and thus the separator is not suitable as a separator for an electrochemical device.

On the contrary, since the separator according to an embodiment of the present disclosure includes the amorphous adhesive binder polymer in an amount of 50-84 parts by weight, it has low air permeability, shows significantly high adhesion to an electrode and low resistance, and thus provides a separator suitable for an electrochemical device.

Meanwhile, the fluorinated binder polymer is not dissolved in an electrolyte so that it can retain a film shape, and shows phase transition property to form pores in the porous coating layer. In addition, the fluorinated binder polymer can prevent slurry for forming a porous coating layer from infiltrating into the pores of the porous substrate. However, when the content of the fluorinated binder polymer is less than 15 parts by weight, pores in the porous coating layer are reduced and the slurry infiltrates to the porous substrate to cause pore blocking, resulting in the problem of an increase in air permeability. In addition, there is a problem in that the amorphous binder polymer occupying a relatively larger proportion is swelled to cause separation of the porous coating layer.

Meanwhile, the amorphous adhesive binder polymer shows high binding force to the inorganic materials and has high affinity with an electrolyte. In addition, the amorphous adhesive binder polymer causes no phase separation when forming the porous coating layer, and thus forms no adhesive layer so that it may reduce the resistance of a separator. Particularly, when the content of the amorphous adhesive binder polymer is 50 parts by weight or more based on 100 parts by weight of the total content of porous polymers, no adhesive layer is formed, and thus it is possible to provide sufficient adhesion to an electrode as well as low resistance, preferably.

Meanwhile, in the case of the conventional separator including a fluorinated binder polymer alone as a binder polymer, it has air permeability similar to the air permeability of the separator according to an embodiment of the present disclosure, but it shows significantly high resistance and significantly low adhesion to an electrode.

In addition, when the content of the amorphous adhesive binder polymer is less than 50 parts by weight, it is possible to provide air permeability similar to or lower than the air permeability of the separator according to an embodiment of the present disclosure. However, in this case, adhesion to an electrode and resistance are merely slightly improved as compared to the conventional separator, but are not sufficient to attain a desired level according to the present disclosure.

According to an embodiment of the present disclosure, the fluorinated binder polymer may be a fluorinated copolymer.

For example, the fluorinated binder polymer may include polyvinylidene fluoride-co-hexafluoropropylene (PVdF-HFP), polyvinylidene fluoride-co-chlorotrifluoroethylene polyvinylidene fluoride-co-polytetrafluoroethylene (PVdF-PTFE), or a mixture of at least two of them.

According to an embodiment of the present disclosure, the fluorinated binder polymer may include polyvinylidene fluoride-co-hexafluoropropylene (PVdF-HFP) and polyvinylidene fluoride-co-chlorotrifluoroethylene.

According to an embodiment of the present disclosure, the weight ratio of polyvinylidene fluoride-co-hexafluoropropylene (PVdF-HFP) to polyvinylidene fluoride-co-chlorotrifluoroethylene may be 90:10-50:50, 80:20-60:40, or 75:25-70:30.

According to the present disclosure, there is no particular limitation in the inorganic particles, as long as they are electrochemically stable. In other words, there is no particular limitation in the inorganic particles that may be used herein, as long as they cause no oxidation and/or reduction in the range (e.g. 0-5V based on $Li/Li^+$) of operating voltage of an applicable electrochemical device. Particularly, when using inorganic particles having a high dielectric constant as the inorganic particles, it is possible to improve the ion conductivity of an electrolyte by increasing the dissociation degree of an electrolyte salt, such as a lithium salt, in a liquid electrolyte.

For the above-mentioned reasons, the inorganic particles may be inorganic particles having a dielectric constant of 5 or more, inorganic particles having lithium ion transportability or a mixture thereof.

The inorganic particles having a dielectric constant of 5 or more may include any one selected from the group consisting of $Al_2O_3$, $SiO_2$, $ZrO_2$, $AlOOH$, $TiO_2$, $BaTiO_3$, $Pb(Zr_xTi_{1-x})O_3$ (PZT, wherein $0<x<1$), $Pb_{1-x}La_xZr_{1-y}Ti_yO_3$ (PLZT, wherein $0<x<1$, $0<y<1$), $(1-x)Pb(Mg_{1/3}Nb_{2/3})O_3-xPbTiO_3$ (PMN-PT, wherein $0<x<1$), hafnia ($HfO_2$), $SrTiO_3$, $SnO_2$, $CeO_2$, MgO, NiO, CaO, ZnO and SiC, or a mixture of two or more of them.

The inorganic particles having lithium ion transportability may be any one selected from the group consisting of include lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$-based glass ($1<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$-based glass ($Li_xSi_yS_z$, $0<x<3$, $0<y<2$, $0<z<4$) and $P_2S_5$-based glass ($Li_xP_yS_z$, $0<x<3$, $0<y<3$, $0<z<7$), or a mixture of two or more of them.

In addition, there is no particular limitation in the average particle diameter of the inorganic particles. However, the inorganic particles preferably have an average particle diameter of 0.001-10 μm, preferably 100-700 nm, and more preferably 150-600 nm, in order to form a coating layer with a uniform thickness and to provide suitable porosity.

According to an embodiment of the present disclosure, the weight ratio of the inorganic particles to the binder polymer may be 90:10-50:50. When the weight ratio of the inorganic particles to the binder polymer satisfies the above-defined range, it is possible to prevent the problem of a decrease in pore size and porosity of the resultant coating layer, caused by an increase in content of the binder polymer. It is also possible to solve the problem of degradation of peeling resistance of the resultant coating layer, caused by a decrease in content of the binder polymer.

The separator according to an embodiment of the present disclosure may further include other additives as ingredients of the porous coating layer, besides the above-described inorganic particles and binder polymers.

Although there is no particular limitation in the thickness of the porous coating layer, the porous coating layer may have a thickness of 1-15 μm, particularly 1.5-10 μm. In addition, the porous coating layer preferably has a porosity of 35-85% but is not limited thereto.

In the separator according to an embodiment of the present disclosure, the porous polymer substrate may be a porous polymer film substrate or a porous polymer nonwoven web substrate.

The porous polymer film substrate may be a porous polymer film including polyolefin, such as polyethylene or polypropylene. Such a polyolefin porous polymer film substrate may realize a shut-down function at a temperature of 80-150° C.

Herein, the polyolefin porous polymer film may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination of two or more of them.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins In addition, there is no particular limitation in the thickness of the porous polymer substrate, the porous polymer substrate has a thickness of 1-100 μm, particularly 5-50 μm. Although there is no particular limitation in the size of the pores present in the porous polymer substrate and porosity, the pore size and porosity may be 0.01-50 μm and 20-75%, respectively.

The separator according to an embodiment of the present disclosure may be obtained by any conventional method known to those skilled in the art. According to an embodiment of the present disclosure, the slurry for forming a porous coating layer may be prepared by dispersing the inorganic particles in polymer dispersion containing the binder polymers dispersed in a solvent, and then the slurry for forming a porous coating layer may be applied to a porous substrate, followed by drying, thereby forming a porous coating layer.

Herein, non-limiting examples of the solvent include water, acetone, tetrahydrofuran, methylene chloride, chloroform, dimethyl formamide, N-methyl-2-pyrrolidone, methyl ethyl ketone and cyclohexane, or a mixture of two or more of them.

Although there is no particular limitation in the process for coating the slurry for forming a porous coating layer onto the porous substrate, it is preferred to use a slot coating or dip coating process. A slot coating process includes coating a slurry supplied through a slot die onto the whole surface of a substrate and is capable of controlling the thickness of a coating layer depending on the flux supplied from a metering pump. In addition, dip coating includes dipping a substrate into a tank containing a slurry to carry out coating and is capable of controlling the thickness of a coating layer depending on the concentration of the slurry and the rate of removing the substrate from the slurry tank. Further, in order to control the coating thickness more precisely, it is possible to carry out post-metering through a Mayer bar or the like, after dipping.

Then, the porous substrate coated with the slurry for forming a porous coating layer is dried by using a dryer, such as an oven, thereby forming a porous coating layer on at least one surface of the porous substrate.

In the porous coating layers, the inorganic particles are bound among themselves by the binder polymer while they are packed and are in contact with each other. Thus, interstitial volumes are formed among the inorganic particles and the interstitial volumes become vacant spaces to form pores.

In other words, the binder polymer attaches the inorganic particles to one another so that they may retain their binding states. For example, the binder polymer connects and fixes the inorganic particles with each other. In addition, the pores of the porous coating layer are those formed by the interstitial volumes among the inorganic particles which become vacant spaces. The space may be defined by the inorganic particles facing each other substantially in a closely packed or densely packed structure of the inorganic particles.

The drying step may be carried out in a drying chamber, wherein the drying chamber is not limited to a particular condition due to the application of a non-solvent.

However, according to an embodiment of the present disclosure, the porous coating layer is dried under a humidified condition. For example, the porous coating layer may be formed at a temperature of 20-45° C., 20-35° C., or 20-30° C., under a relative humidity of 15-70%, 15-50%, or 30-45%. Even though the porous coating layer is formed under such a humidified condition, the binder polymers may be distributed homogeneously in the porous coating layer according to the present disclosure.

In another aspect of the present disclosure, there is provided an electrochemical device including a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium metal secondary batteries, lithium ion secondary batteries, lithium polymer secondary batteries or lithium ion polymer batteries, are preferred.

The cathode and the anode used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, nickel alloys or a combination thereof.

The electrolyte that may be used in the electrochemical device according to the present disclosure is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a mixture thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

1) Manufacture of Anode

Artificial graphite, carbon black, carboxymethyl cellulose (CMC) and styrene butadiene rubber were mixed with water at a weight ratio of 96:1:2:2 to obtain anode slurry. The resultant anode slurry was coated on copper (Cu) foil as an anode current collector with a capacity of 3.55 mAh/g to form a thin electrode plate, which, in turn, was dried at 135° C. for 3 hours or more and then pressed to obtain an anode.

2) Manufacture of Cathode $LiNi_{0.6}Co_{0.2}Mn_{0.2}O_2$ as a cathode active material, carbon black and polyvinylidene fluoride (PVdF) were introduced to N-methyl-2-pyrrolidone (NMP) at a weight ratio of 96:2:2 and mixed to obtain cathode slurry. The resultant cathode slurry was coated on aluminum foil (thickness 20 μm) as a cathode current collector with a capacity of 3.28 mAh/g to obtain a cathode.

3) Manufacture of Separator

The binder polymer having the composition as shown in Table 1 was introduced to acetone as a solvent and dissolved therein at 50° C. for about 4 hours to obtain a binder polymer solution. Alumina ($Al_2O_3$) (particle size: 500 nm) and boehmite (AlO(OH)) (particle size: 250 nm) were introduced to the binder polymer solution as inorganic particles at a weight ratio of 9:1. Herein, the weight ratio of the binder polymer to the total inorganic particles was controlled to 1:4. Then, cyanoethyl polyvinyl alcohol as a dispersing agent was added in an amount of 2 parts by weight based on the total content of the inorganic particles, and the inorganic particles were pulverized and dispersed by using a ball milling process for 12 hours to obtain slurry for forming a porous coating layer having a ratio of solvent to solid content of 4:1.

The slurry for forming a porous coating layer was applied to both surfaces of a polyethylene porous film (porosity: 45%) at 23° C. under a relative humidity of 40% to a total loading amount of 13.5 g/m², followed by drying, thereby providing a separator having a porous coating layer formed thereon.

4) Adhesion of Separator with Electrode

Then, the separator and the electrode were laminated in such a manner that the porous coating layer of the separator might face the anode active material layer of the electrode of 1), and pressing was carried out at 70° C. under 600 kgf for 1 sec to obtain an electrode assembly including the anode laminated with the separator.

Examples 2-5

Electrochemical devices were obtained in the same manner as Example 1, except that the content of binder polymer was controlled as shown in the following Table 1.

Comparative Examples 1-4

Electrochemical devices were obtained in the same manner as Example 1, except that the content of binder polymer was controlled as shown in the following Table 1.

Test Example 1A

Polyvinylidene fluoride-co-hexafluoropropylene was introduced to N-methyl-2-pyrrolidone (NMP) as a solvent and dissolved therein at 50° C. for about 4 hours to obtain a binder polymer solution having a concentration of 20 wt %. The binder polymer solution was coated on a glass plate through a bar coating process to obtain a binder polymer film having a thickness of 50 μm. After drying the binder polymer film at 120° C., it was peeled off from the glass plate and vacuum-dried to remove the remaining solvent, and then cut into a diameter of 20 mm.

The binder polymer film was dipped in ethyl methyl carbonate as a solvent and a change in film weight was observed as a function of dipping time. The results are shown in FIG. 3.

Test Example 1B

A binder film was obtained in the same manner as Test Example 1A, except that polyvinyl acetate was used as a binder polymer, instead of polyvinylidene fluoride-co-hexafluoropropylene, and the resultant binder polymer film was coated on a release agent-treated polyethylene terephthalate (PET) film so that it might be peeled off with ease The binder polymer film was dipped in ethyl methyl carbonate as a solvent and a change in film weight was observed as a function of dipping time. The results are shown in FIG. 3.

Figure 3:
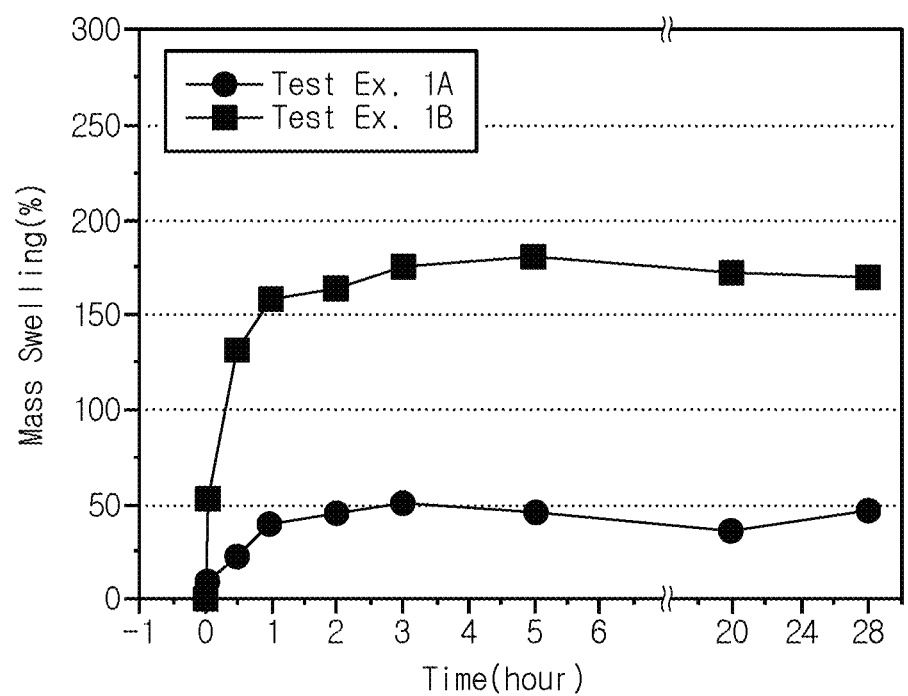
FIG. 3 is a graph illustrating the results of swelling of different types of binder polymer films to a solvent.

As shown in FIG. 3, when using polyvinyl acetate as a binder polymer, no significant swelling is observed with the lapse of dipping time. On the contrary, in the case of polyvinylidene fluoride-co-hexafluoropropylene, it can be seen indirectly that it has low affinity with an electrolyte.

TABLE 1

| | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|
| PVdF-HFP:PVdF-CTFE:PVAc (parts by weight) | 0:30:70 | 30:0:70 | 20:10:70 | 31:14:55 | 14:6:80 | 70:30:0 | 0:0:100 | 38.5:16.5:45 | 7:3:90 |

TABLE 1-continued

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|
| Content of amorphous adhesive binder polymer based on 100 parts by weight of total binder polymer content (parts by weight) | 70 | 70 | 70 | 55 | 80 | 0 | 100 | 45 | 90 |
| Thickness (μm) | 16.6 | 17.0 | 17.0 | 17.5 | 16.9 | 18.2 | 17.8 | 17.2 | 18.5 |
| Loading amount of slurry for forming porous coating layer (g/m²) | 13.5 | 13.7 | 13.6 | 14.1 | 13.8 | 13.7 | 13.7 | 13.3 | 13.9 |
| Air permeability (sec/100 mL) | 688 | 722 | 612 | 471 | 726 | 764 | 1107 | 461 | 924 |
| Lami Strength (gf/25 mm) (at 70° C., 600 kgf) | 150 | 143 | 137 | 72 | 168 | 62 | 187 | 59 | 198 |
| Peel Strength (gf/25 mm) | Overload (Porous polymer substrate is broken during test due to high adhesion strength) | Overload (Porous polymer substrate is broke during test due to high adhesion strength) | 380 | 297 | Overload (Porous polymer substrate is broke during test due to high adhesion strength) | 170 | Overload (Porous polymer substrate is broke during test due to high adhesion stength) | 248 | Overload (Porous polymer substrate is broke during test due to high adhesion strength) |
| Resistance (ohm) (Overall resistance of separator) | 0.81 | 0.65 | 0.67 | 0.69 | 0.68 | 0.97 | Porous coating layer is separated upon addition of electrolyte for measuring resistance | 0.72 | Porous coating layer is separated upon addition of electrolyte for measuring resistance |

** PVdF-HFP: Polyvinylidene fluoride-co-hexafluoropropylene
** PVdF-CTFE: Polyvinylidene fluoride-co-chlorotrifluoroethylene
** PVAc: Polyvinyl acetate (Sigma Aldrich Co., CAT. 387932) (crystallinity: 0%, glass transition temperature: 30° C.)

Evaluation Methods

1) Determination of Adhesion (Lami Strength) Between Separator and Electrode

An anode was obtained in the same manner as Example 1-1) and was cut into a size of 25 mm×100 mm. Each of the separators according to Examples 1-5 and Comparative Examples 1-4 was cut into a size of 25 mm×100 mm. The separator was stacked with the anode, and the stacked product was inserted between PET films having a thickness of 100 μm and adhered by using a flat press. Herein, the flat press was heated at 70° C. under a pressure of 600 kgf for 1 second. The adhered separator and anode were attached to slide glass by using a double-sided tape. The end portion (10 mm or less from the end of the adhered surface) of the adhered separator was stripped off and attached to a 25 mm×100 mm PET film by using a single-sided tape so that they might be connected in the longitudinal direction. Then, slide glass was mounted to the lower holder of a UTM instrument (LLOYD Instrument LF Plus), the PET film having the separator attached thereto was mounted to the upper holder of the UTM instrument, and force was applied at 180° and a rate of 300 mm/min. The force required for separating the anode from the porous coating layer facing the anode was measured.

2) Determination of Adhesion (Peel Strength) between Porous Polymer Substrate and Porous Coating Layer Each of the separators according to Examples 1-5 and Comparative Examples 1-4 was cut into a size of 15 mm×100 mm. A double-sided adhesive tape was attached to a glass plate and the porous coating layer surface of the separator was attached to the adhesive tape. Then, the end portion of the separator was mounted to a UTM instrument (LLOYD Instrument LF Plus), and force was applied at 180° and a rate of 300 mm/min. The force required for separating the porous coating layer from the porous polymer substrate was measured.

3) Determination of Thickness

The thickness of a separator was determined by using a thickness measuring instrument (Mitutoyo Co., VL-50S-B).

4) Determination of Air Permeability

The air permeability of each separator was determined by using a Gurley type air permeability tester according to JIS P-8117. Herein, the time required for 100 mL of air to pass through a diameter of 28.6 mm and an area of 645 mm² was measured.

5) Determination of Resistance of Separator

The resistance of each of the separators according to Examples 1-5 and Comparative Examples 1-4 was determined by dipping each separator in an electrolyte. Herein, 1M LiPF$_6$ dissolved in ethylene carbonate/ethylmethyl carbonate (weight ratio 3:7) was used as an electrolyte and the alternating current resistance was measured at 25° C.

The results are shown in FIGS. 1A-1C and FIGS. 2A-2C.

Figure 1B:
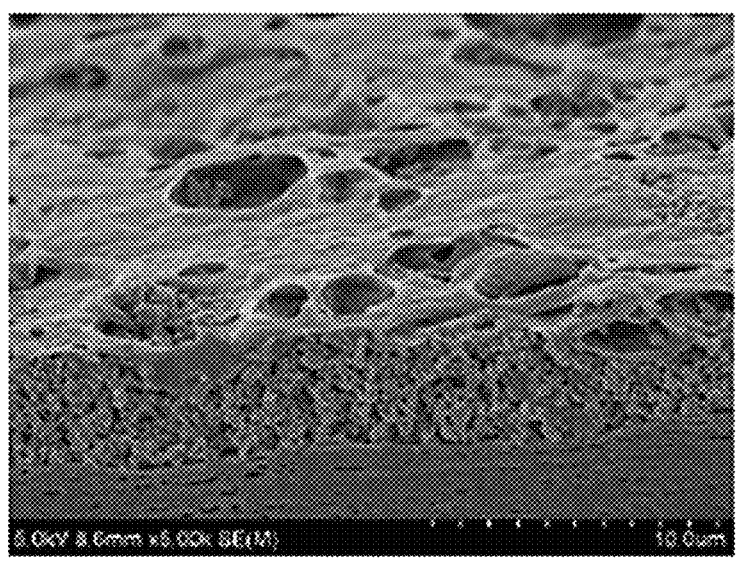
Figure 1C:
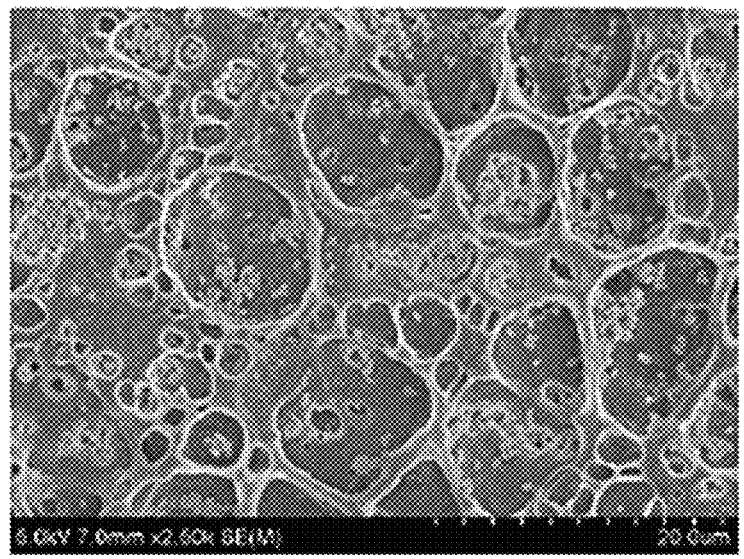

FIG. 1A to FIG. 1C show scanning electron microscopic (SEM) images illustrating the section and the surface of the separator according to Comparative Example 1. Particularly, FIG. 1A illustrates the section of the separator using a fluorinated binder polymer alone, and FIG. 1B is an enlarged view of FIG. 1A. FIG. 1C show a SEM image illustrating the surface of the separator as shown in FIG. 1A. As can be seen from FIG. 1A to FIG. 1C, when using a fluorinated binder polymer alone, an adhesive layer is formed on a porous coating layer. In other words, the porous layer and the adhesive layer cause interfacial separation.

Figure 2A:
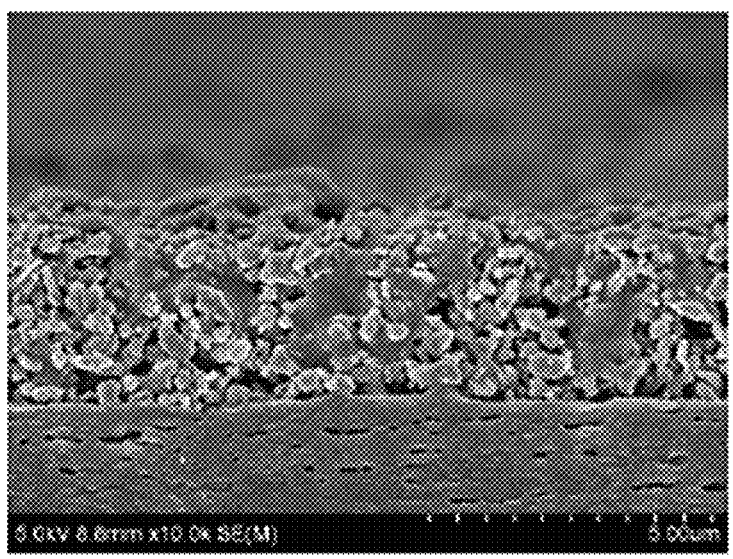
FIG. 2A to FIG. 2C show scanning electron microscopic (SEM) images illustrating the section and the surface of the separator according to Example 3.
Figure 2B:
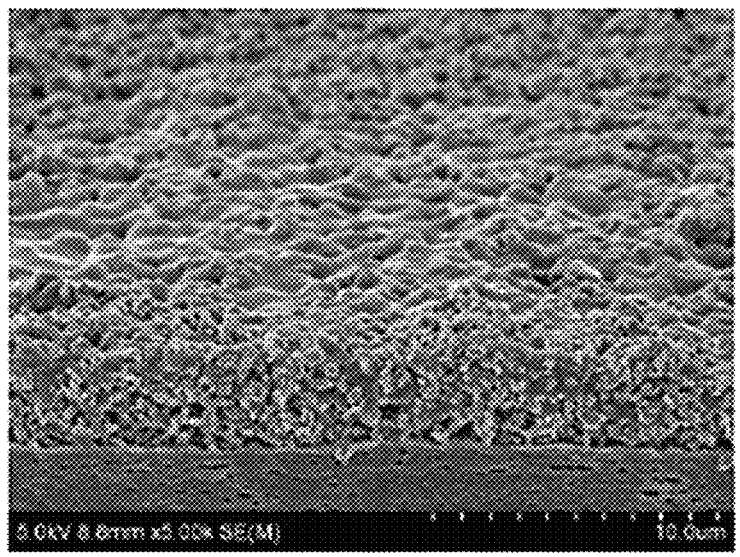
Figure 2C:
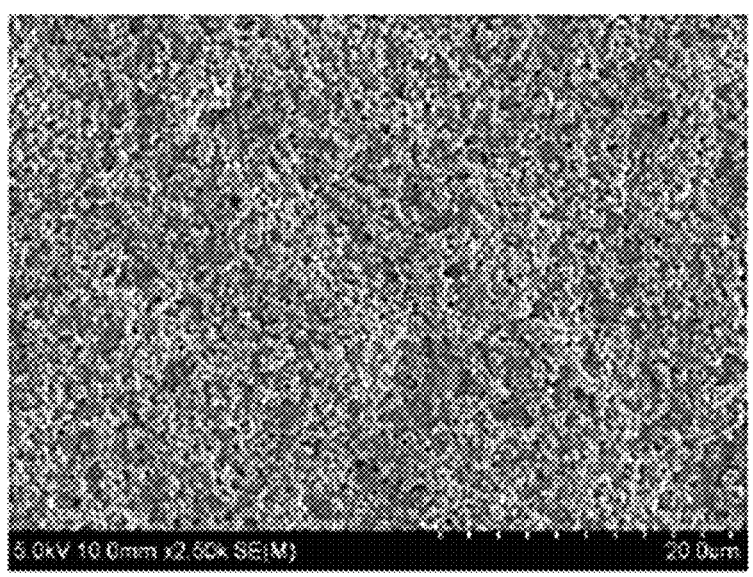

FIG. 2A to FIG. 2C show SEM images illustrating the section and the surface of the separator according to Example 3. Particularly, FIG. 2A illustrates the section of the separator using an amorphous adhesive binder polymer in combination with a fluorinated binder polymer, and FIG. 2B is an enlarged view of FIG. 2A. FIG. 2C show a SEM image illustrating the surface of the separator as shown in FIG. 2A. As can be seen from FIG. 2A to FIG. 2C, the separator according to an embodiment of the present disclosure causes no separation between the porous coating layer and the adhesive layer. In other words, the binder polymer according to the present disclosure, i.e. the amorphous adhesive binder polymer and the fluorinated binder polymer are distributed homogeneously in the thickness direction of the porous coating layer and no separate adhesive layer is formed.

What is claimed is:

1. A separator for an electrochemical device, comprising:
    a porous polymer substrate having a plurality of pores; and
    a porous coating layer formed on at least one surface of the porous polymer substrate, and containing a plurality of inorganic particles and a binder polymer positioned on the whole or a part of the surface of the inorganic particles to connect the inorganic particles with one another and fix the inorganic particles,
    wherein the binder polymer comprises an amorphous adhesive binder polymer; and at least one fluorinated binder polymer,
    wherein the binder polymer is distributed homogeneously in a thickness direction of the porous coating layer,
    the amorphous adhesive binder polymer comprises polyvinyl acetate, and
    a content of the polyvinyl acetate is 55-84 parts by weight based on 100 parts by weight of a total binder polymer content, and
    the amorphous adhesive binder polymer has a crystallinity of 0% and a weight average molecular weight of 1,000,000 or less, and is compatible with the fluorinated binder polymer.

2. The separator for an electrochemical device according to claim 1, wherein a weight ratio of the inorganic particles to the binder polymer is 90:10-50:50.

3. The separator for an electrochemical device according to claim 1, wherein an internal resistance of the porous coating layer equals to the a surface resistance of the porous coating layer.

4. The separator for an electrochemical device according to claim 1, wherein the porous coating layer is formed at a temperature of 20-45° C. under a relative humidity of 15-70%.

5. The separator for an electrochemical device according to claim 1, wherein the amorphous adhesive binder polymer and the fluorinated binder polymer are distributed homogeneously in the thickness direction of the porous coating layer.

6. The separator for an electrochemical device according to claim 1, wherein the content of the amorphous adhesive binder polymer is 55-80 parts by weight based on 100 parts by weight of the total binder polymer content.

7. The separator for an electrochemical device according to claim 1, wherein the content of the polyvinyl acetate is 55-80 parts by weight based on 100 parts by weight of the total binder polymer content.

8. The separator for an electrochemical device according to claim 1, wherein the content of the polyvinyl acetate is 55-70 parts by weight based on 100 parts by weight of the total binder polymer content.

9. The separator for an electrochemical device according to claim 1, wherein the amorphous adhesive binder polymer has a glass transition temperature less than 70° C.

10. The separator for an electrochemical device according to claim 9, wherein the amorphous adhesive binder polymer further comprises repeating units derived from an imide- or ether-based monomer.

11. The separator for an electrochemical device according to claim 1, wherein the fluorinated binder polymer comprises polyvinylidene fluoride-co-hexafluoropropylene (PVdF-HFP), polyvinylidene fluoride-co-chlorotrifluoroethylene, polyvinylidene fluoride-co-polytetrafluoroethylene (PVdF-PTFE), or a mixture of at least two of them thereof.

12. The separator for an electrochemical device according to claim 7, wherein the fluorinated binder polymer comprises polyvinylidene fluoride-co-hexafluoropropylene (PVdF-HFP) and polyvinylidene fluoride-co-chlorotrifluoroethylene.

13. The separator for an electrochemical device according to claim 12, wherein a weight ratio of polyvinylidene fluoride-co-hexafluoropropylene (PVdF-HFP) to polyvinylidene fluoride-co-chlorotrifluoroethylene is 90:10-50:50.

14. The separator for an electrochemical device according to claim 12, wherein a weight ratio of polyvinylidene fluoride-co-hexafluoropropylene (PVdF-HFP) to polyvinylidene fluoride-co-chlorotrifluoroethylene is 80:20-60:40.

15. The separator for an electrochemical device according to claim 12, wherein a weight ratio of polyvinylidene fluoride-co-hexafluoropropylene (PVdF-HFP) to polyvinylidene fluoride-co-chlorotrifluoroethylene is 75:25-70:30.

16. An electrochemical device comprising a cathode, an anode, and a the separator according to claim 1 interposed between the cathode and the anode, wherein the separator is the same as defined in claim 1.

* * * * *